US 8,856,789 B2

Oct. 7, 2014

(12) United States Patent
Torrey

(10) Patent No.: US 8,856,789 B2
(45) Date of Patent: Oct. 7, 2014

(54) FACILITATING EXECUTION OF A SELF-MODIFYING EXECUTABLE

(75) Inventor: Jacob Torrey, Ava, NY (US)

(73) Assignee: Assured Information Security, Inc., Rome, NY (US)

( * ) Notice: Subject to any disclaimer, the term of this patent is extended or adjusted under 35 U.S.C. 154(b) by 245 days.

(21) Appl. No.: 13/605,663

(22) Filed: Sep. 6, 2012

(65) Prior Publication Data

US 2014/0068612 A1 Mar. 6, 2014

(51) Int. Cl.
| | |
|---|---|
| *G06F 9/455* | (2006.01) |
| *G06F 12/14* | (2006.01) |
| *G06F 21/60* | (2013.01) |
| *G06F 21/50* | (2013.01) |
| *G06F 21/00* | (2013.01) |

(52) U.S. Cl.
CPC ............ *G06F 9/45533* (2013.01); *G06F 21/60* (2013.01); *G06F 21/50* (2013.01); *G06F 21/00* (2013.01)
USPC ........... 718/1; 726/2; 726/16; 726/17; 726/26

(58) Field of Classification Search
None
See application file for complete search history.

(56) References Cited

U.S. PATENT DOCUMENTS

2009/0038017 A1* 2/2009 Durham et al. ................. 726/27

OTHER PUBLICATIONS

S. Sparks and J. Butler, "Shadow Walker: Raising the Bar for Rootkit Detection," Blackhat Japan, 2005 (www.blackhat.com/presentations/bh-jp-05-sparks-butler.pdf).

S. Sparks and J. Butler, "Shadow Walker: Raising the Bar for Rootkit Detection," Phrack Inc., vol. 0x0b, Issue 0x3d, Phile #0x08 of 0x14, 2005 (www.phrack.com/issues.html?issue=63&id=8#article.
P. Van Oorschot, A. Somayaji and G. Wurster, "Hardware-assisted Circumvention of Self-hashing Software Tamper Resistance," IEEE Trans. on Dependable and Secure Computing, 2005.
R. Riley, X. Jiang, D. Xu, "An Architectural Approach to Preventing Code Injection Attacks," ASIACCS, 2011.
X. Jiang, D. Xu, "Stealthy Malware Detection and Monitoring Through VMM-Based 'Out-of-the-Box' Semantic View Reconstruction," ACM Transactions on Information and System Security, vol. 13, No. 2, 2010 (www.CSC.ncsu.edu/faculty/jiang/pubs/CC207.pdf.
J. Rhee, X. Jiang, "Defeating Dynamic Data Kernel Rootkit Attaches via VMM-based Guest-Transparent Monitoring," Proceedings of 4th International Conference on Availability, Reliability and Security, Fukuoka, Japan, 2009.
"Intel® 64 and IA-32 Architectures Software Developer's Manual, vol. 3A: System Programming Guide, Part 1" 253668-043US, May 2012 (http://download.intel.com/products/processor/manual/253668.pdf).

(Continued)

*Primary Examiner* — Qing Wu
(74) *Attorney, Agent, or Firm* — Heslin Rothenberg Farley & Mesiti P.C.

(57) ABSTRACT

Trusted execution of a self-modifying executable is facilitated. An attempt to access a data portion of a self-modifying executable during execution of the self-modifying executable is detected. The self-modifying executable includes the data portion, for storing data to be accessed during execution of the self-modifying executable, and an instruction portion including instructions for execution of the self-modifying executable. The attempt to access the data portion is retargeted to a separate portion of memory space that is separate from another portion of memory space in which the self-modifying executable is loaded for execution. Meaningful measurability of the integrity of the self-modifying executable is thereby provided.

20 Claims, 10 Drawing Sheets

(56) References Cited

OTHER PUBLICATIONS

"Intel® 64 and IA-32 Architectures Software Developer's Manual, vol. 3C: System Programming Guide, Part 3," 326019-043US, May 2012 (http://download.intel.com/products/processor/manual/326019.pdf).

"System Virginity Verifier: Defining the Roadmap for Malware Detection on Windows System," Hack in the Box Security Conference, Sep. 28-29, 2005, Kuala Lumpur, Malaysia, Joanna Rutkowska (http://invisiblethings.org).

\* cited by examiner

US 8,856,789 B2

FACILITATING EXECUTION OF A SELF-MODIFYING EXECUTABLE

STATEMENT REGARDING FEDERALLY SPONSORED RESEARCH AND DEVELOPMENT

This invention was made, in part, with government support under contract number HR0011-11-F-0002 awarded by the Defense Advanced Research Project Agency (DARPA). Accordingly, the United States Government may have certain rights in the invention.

BACKGROUND

Verification of executable code refers to measurement of a state of an executable prior to execution thereof and comparison of that state against an expected state in order to determine (i.e. verify) that they are the same. This type of verification is currently used in various different technologies including the Trusted Platform Module (based on a specification promulgated by the Trusted Computing Group™), the Trusted Execution Technology (offered by Intel Corporation, Mountain View, Calif.) and other Hardware Dynamic Root of Trust Measurement (H-DRTM) technologies, Basic Input/Output Systems, the Unified Extensible Firmware Interface, and various gaming applications, among other technologies. The constant thread of each of these is that they measure the state of software prior to execution, where all data is statically initialized to a known state. In one example, the measurement of the pre-execution state generates a hash of a portion of the code when the application, program or system is loaded. Some executables are self-modifying, or dynamic, wherein execution of instruction(s) of the executable cause modification to portion(s) of the executable itself. In these cases, once the executable code has begun executing, the self-modifying executable gains a 'dynamic state' where some values that were known (pre-execution) may no longer be in the same state. Verification of the dynamic state against the measured pre-execution state is useless in this case, since the dynamic state is almost guaranteed to be different from the pre-execution state.

BRIEF SUMMARY

Shortcomings of the prior art are overcome and additional advantages are provided through the provision of a method to facilitate trusted execution of a self-modifying executable. The method includes, for instance, detecting, by a hypervisor managing execution of a guest system on a processor, an attempt by the guest system to access a data portion of the self-modifying executable during execution of the self-modifying executable, the self-modifying executable comprising the data portion for storing data to be accessed during execution of the self-modifying executable and an instruction portion comprising instructions for execution of the self-modifying executable; and retargeting, by the hypervisor, the attempt to access the data portion to a separate portion of memory space, separate from another portion of memory space in which the self-modifying executable is loaded for execution.

In another aspect, a computer program product is provided to facilitate trusted execution of a self-modifying executable. The computer program product includes a computer readable storage medium readable by a processor and storing instructions for execution by the processor to perform a method which includes, for instance, detecting, by a hypervisor managing execution of a guest system, an attempt by the guest system to access a data portion of the self-modifying executable during execution of the self-modifying executable, the self-modifying executable comprising the data portion for storing data to be accessed during execution of the self-modifying executable and an instruction portion comprising instructions for execution of the self-modifying executable; and retargeting, by the hypervisor, the attempt to access the data portion to a separate portion of memory space, separate from another portion of memory space in which the self-modifying executable is loaded for execution.

In yet another aspect, a computer system is provided to facilitate trusted execution of a self-modifying executable. The computer system includes a memory, and a processor in communication with the memory, and the computer system is configured to perform a method which includes, for instance, detecting, by a hypervisor managing execution of a guest system, an attempt by the guest system to access a data portion of the self-modifying executable during execution of the self-modifying executable, the self-modifying executable comprising the data portion for storing data to be accessed during execution of the self-modifying executable and an instruction portion comprising instructions for execution of the self-modifying executable; and retargeting, by the hypervisor, the attempt to access the data portion to a separate portion of memory space, separate from another portion of memory space in which the self-modifying executable is loaded for execution.

Additional features and advantages are realized through the concepts of one or more aspects of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of aspects of the invention are apparent from the following detailed description taken in conjunction with the accompanying drawings in which:

DETAILED DESCRIPTION

Figure 1A:
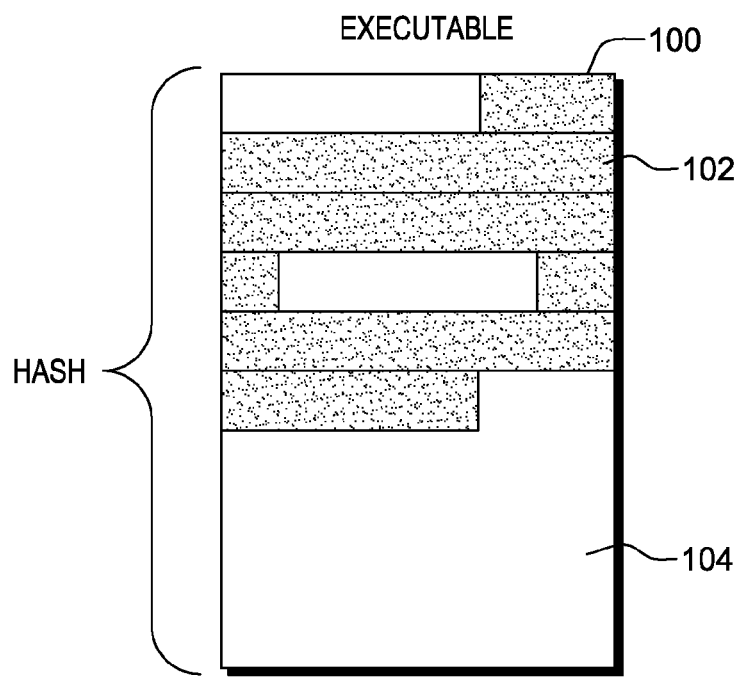
FIGS. 1A and 1B depict states of a self-modifying executable before and after commencement of execution thereof.
Figure 1B:
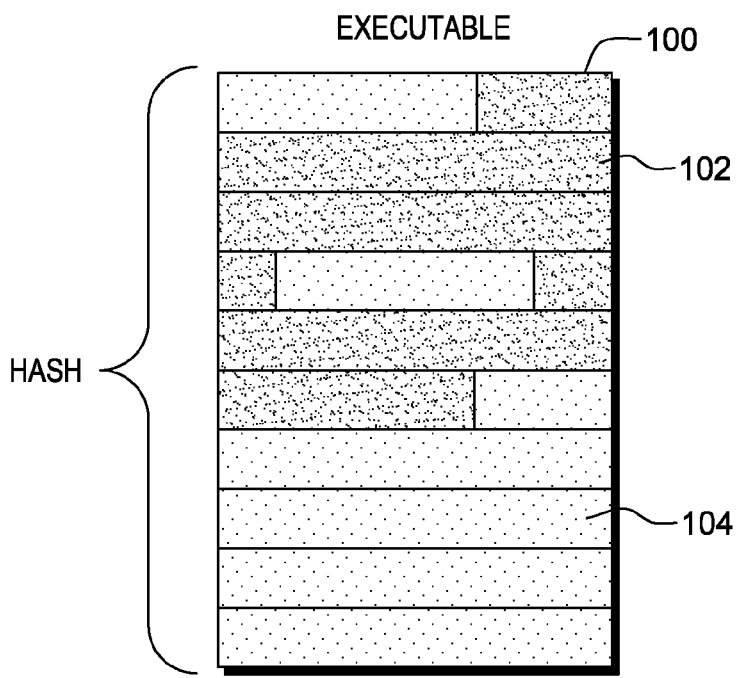

Measurement of the state of software prior to execution thereof can be useful for verifying that the software begins in a safe state. For a self-modifying executable (also referred to herein as a self-modifying application, or dynamic application/executable), the pre-execution measurement will almost surely differ from a measurement taken after commencement of (e.g., during) execution of the self-modifying executable. FIGS. 1A and 1B depict the changing state of a self-modifying executable before and after commencement of execution thereof. FIG. 1A depicts the state of a self-modifying executable, present in memory, prior to commencement of execution. Self-modifying executable 100 has an instruction portion 102 interlaced with a data portion 104. Instruction portion 102 includes instructions that, during execution of the executable, are fetched and executed by a processor to perform the various functions of the self-modifying executable. One such function may be to access data (i.e. read/write data from/to) portion 104. Data accesses read from or write to temporary variables, for instance, having values that change during execution of self-modifying executable 100.

A measurement (e.g., hash in FIG. 1A) can be taken across self-modifying executable 100. The measurement will depend, in this example, on the data contained in instruction portion 102 and data portion 104. In other examples, the hash can be taken across a portion less than the entire executable, such as across just the instruction portion 102. In some instances, though not all, the instruction portion is most important from a security standpoint, since outside instructions might be injected into the self-modifying executable and executed to perform malicious activity.

In FIG. 1A, data portion 104 is uninitialized, null, zeroed, or otherwise contains data that is subject to change during execution of self-modifying executable 100. Thus, in FIG. 1B, which depicts the state of self-modifying executable 100 after it has been running for a period of time after commencing execution, data portion 104 has been accessed and dynamic data written into data portion 104. A measurement (e.g., hash) taken across self-modifying executable 100 in FIG. 1B is virtually guaranteed (with any well-designed hash algorithm) to differ from the initial hash of FIG. 1A obtained pre-execution. The initial hash from FIG. 1A therefore becomes meaningless in terms of verifying the integrity of self-modifying executable 100; a difference between the hashes will be observed, yet it will not be known whether the changes to the self-modifying executable were caused by malicious activity or by the normal course of operation of the self-modifying executable.

This is disadvantageous when it is desired to verify that the self-modifying executable has not been compromised after it has begun executing. One example of such a compromise is a modification to either the instruction portion or the data portion (or both) to include an embedded security threat or software bug. It is desirable to detect when the instruction portion of a self-modifying executable (which is the operative portion thereof) has been tampered with during execution of the self-modifying executable, however, as noted, it is not possible to determine whether the state measurement (hash) after execution has begun differs from the pre-execution state measurement due to malicious activity or the routine data accesses made by the instructions of the original executable.

Attempts have been made to address this problem. Some have proposed that the executable be re-written to remove all non-stack and non-heap based memory. That approach, however, is infeasible for system level code. Another option is to re-write the compiler (of the executable) and operating system (on which the executable executes) to label all data references in the executable, so that the labeled data references can be disregarded when checksumming the executable. This option, however, fails to address the problem with respect to existing products. Lastly, others instead simply forego integrity measurements altogether after execution has begun, on the basis that meaningful integrity measurements post-execution are not possible.

In one particular approach, used with applications that execute from user space (as opposed to, for instance, kernel space), the self-modifying executable is compiled and linked in such a fashion that the data portion and instruction portion (sometimes termed 'code' portion) reside on different pages in memory. The Portable Executable (PE) format used by some Windows®-based Operating System products (offered by Microsoft Corp., Redmond, Wash.) subscribes to this paradigm. The PE format provides the application loader (sometimes termed "driver loader") with the requisite information to load the executable into memory, adjust any addresses which may have been changed, and link in any shared libraries before execution. The PE format divides the binary into a number of different sections, some for code (generally labeled .text), some for data (.data) and other informational sections.

Figure 2:
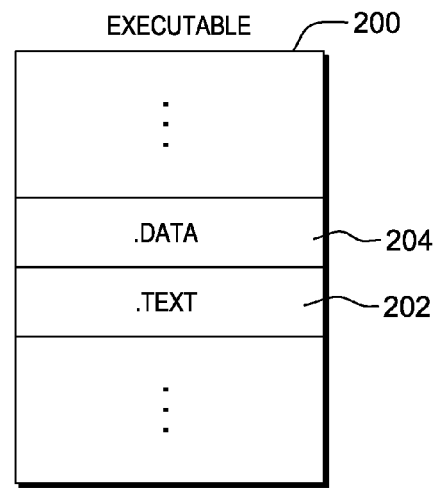
FIG. 2 depicts an example of a self-modifying executable in a portable executable format.

An example of a self-modifying executable in the portable executable format is depicted in FIG. 2. Self-modifying executable 200 includes a '.text' section 202 which is mapped as execute and read-only, for code, and a '.data' section 204 which is mapped as no-execute and read-write, for data. Thus, program code, i.e. instructions, of executable 200 is stored in .text section 202 which is made to be readable and executable (but not writable), and data, including global variables, are stored in .data section which is made to be readable and writable but not executable (i.e. instructions in .data section are not able to be fetched and executed). With the self-modifying executable 200 loaded into memory and the attributes of the memory pages storing the executable having the above-noted permissions, a write to the .text section will generate a fault and the kernel will abort the process in order to prevent corruption.

The PE format facilitates measurability of the self-modifying executable during execution thereof because the operating system (OS) specifically splits out the dynamic portion from the static portion of the executable. However, some more privileged executables, such as boot-loaders, operating system kernels, hypervisors, system management interrupt handlers, firmware code, and non user-space applications, are usually not compiled and linked as above, where the data and instruction portions are separated. Instead, their data and code portions are intermixed (as seen in FIGS. 1A, 1B). As discussed above, once allowed to execute for a period of time, measurement of these binaries to ensure code trustworthiness is not a viable option. What is needed is the ability to measure an executable regardless of whether or not the dynamic and static states are conveniently separated, and regardless of the memory space in which the application is loaded for execution.

In order to facilitate understanding of various aspects of the present invention, a brief background is provided on some features of modern computer platform technologies. Modern processors (e.g., CPUs) are able to provide each process executing on the processor with a unique view of memory. This feature, known as virtual memory, eases the operating system's task of isolating different applications and providing each application with a similar view of memory. When a virtual memory address is accessed by an application, the processor uses a number of data structures and other facilities to automatically translate the virtual memory address into a physical memory address. As an example, the processor includes a control register (e.g., CR3 register on the x86 instruction set architecture) to find a page directory and optionally a page table, which holds the desired physical memory address. In most modern operating systems, each process is given its own set of page translation structures (paging structures) to map the 'flat' memory view provided to the computer system's physical memory.

One or more translation lookaside buffers (TLBs, collectively referred to as the TLB) act as a cache for these mappings/translations. Due to relatively high memory latency compared to cache-access speed, page translation lookups are expensive in terms of time. These operations are optimized by caching the virtual to physical mappings in the TLB. While logically the TLB store the translations for all accessed addresses in the same area, the typical physical implementation splits the TLB into more than one hardware buffer: one for instruction addresses ("Instruction TLB", "ITLB", or "I-TLB") and one for data addresses (Data TLB, "DTLB", or "D-TLB"). This implementation detail allows the TLB to point to different addresses for instruction fetches as compared to data accesses.

There has been past work that takes advantage of this split-TLB nature for malicious purposes. Examples include, for instance, the "Shadow Walker" rootkit (S. Sparks and J. Butler, "Shadow Walker: Raising the Bar for Rootkit Detection," in *Blackhat Japan*, 2005) and other technology for preventing self-verifying applications from detecting corruption (P. van Oorschot, A. Somayaji and G. Wurster, "Hardware-assisted circumvention of self-hashing software tamper resistance," in *IEEE TRANS. ON DEPENDABLE AND SECURE COMPUTING*, 2005). Shadow Walker is a memory hiding rootkit designed to hide the presence of a kernel driver through TLB splitting. When code is accessed as data, such as by an anti-virus tool, Shadow Walker causes the D-TLB to point toward an un-modified kernel region. When the target section is executed (i.e., accessed and retrieved for execution by an instruction fetch), the I-TLB is filled with the address of the malicious driver's code, allowing the malicious code to run as expected. A similar technique is used in the Oorschot publication to prevent self-hashing applications from detecting the malicious modification of the application. When separate TLBs point a unique address to different memory locations depending, for instance, on whether the address is being accessed by a data access or an instruction access, the TLBs are said to be desynchronized ("split"). TLBs can also be desynchronized from the paging structure entries from which the TLBs cache the address translations. For instance, when a TLB contains a cached translation for a page that is marked in a paging structure as no longer present in memory, the TLB is said to be desynchronized from the paging structure. Typically, this form of desynchronization is not desired, though, as described below, it can be leveraged to facilitate aspects of the present invention.

Technology such as the above is not enough to address the problems described previously with measuring a self-modifying executable. For instance, a page fault handler hook needs to know which pages from the critical application to desynchronize, and the self-modifying code will not execute, unmodified, in an environment that has a desynchronized TLB. Additionally, the above technology operates at the operating system level, failing to provide for kernel mode or real mode TLB desynchronization because it cannot handle an operating system's running memory manager.

Additional discussion of how an operating system manages the paging structures is now presented. While paging can be used merely to isolate processes, as described above, it can also be used by most operating systems for memory management, where pages of memory are paged-out when not in use. The process of paging-out is well-known in the art. In general, when the system is running low on physical memory (i.e., "working memory" such as RAM), the operating system, such as the memory manager thereof, determines one or more memory pages that are being used least frequently and copies their contents to a hard disk, or another, larger storage system. The operating system then invalidates any translations pointing to that physical memory region by altering the paging structures to note that region as paged-out. When a process tries to access one of the invalidated translations, the processor identifies that region as being paged out and causes an exception known as a page fault. A page fault handler of the operating system may then copy the paged-out data from the hard disk back into a free physical page in memory and update the paging structures to reflect the new physical address. This allows the application's memory to be transparently moved to and from the hard disk as needed without causing serious interruption in program execution.

A page fault handler is written in such a way as to ensure that the in-memory paging structures and the TLB remain synchronized. The x86 architecture (originally designed by Intel Corporation, Santa Clara, Calif.) provides the INVLPG instruction which invalidates an entry in the TLB, forcing the processor to re-walk the paging structures next time that address is requested, and pull the (updated) entry back into the TLB. When the x86 processor's control register (CR3) is changed—most commonly during a process context switch—all TLB entries are invalidated unless they are specifically marked as global. Global pages are most commonly used for shared libraries and operating kernel functions exported to user-land applications, and thus benefit from remaining in the TLB across context switches.

In recent years, the use of virtual machines (VMs) has gained momentum in various applications including datacenter consolidation. A hypervisor, also known as a virtual machine monitor (VMM), allows multiple virtual machines, perhaps each with its own operating system executing thereon, to run simultaneously on the same physical hardware system. In this architecture, each virtual machine is isolated from the others and is provided a normal system environment for execution. While some hypervisors require that changes be made to a guest operating system to function properly (this practice is known as para-virtualization), many hypervisors leverage newer processor "extensions" to allow an unmodified operating system to run with only minor interactions from the hypervisor. These extensions, termed virtual machine extensions, or VMX, improve performance by empowering the physical processor and chipset to perform more of the isolation and virtual machine memory management in hardware, as opposed to software (the hypervisor). VMX enables the hypervisor to set a number of different exit conditions for each guest virtual machine which, when an exit condition is met, will trigger a VM EXIT, returning control to the hypervisor for handling the exit condition.

In most recent implementations of virtual machine extensions, both Intel and Advanced Micro Devices (Sunnyvale, Calif.—another processor manufacturer), have released the extended page table (EPT) and rapid virtualization indexing (RVI) technologies, respectively. These technologies enable a hypervisor to assume an even more limited role in the memory management and isolation of each guest system. EPT and RVI provide another layer of paging structures, beyond those maintained by a memory manager of an operating system executing in a virtual machine. EPT and RVI are paging structures that enable translation of addresses that the virtual machine operating system believes to be the correct physical address (termed "guest-physical address") to the machine (actual) physical address. With EPT and RVI, the physical processor can automatically translate a guest-physical address to a machine physical address in a fashion similar to conventional paging, and provide a VM EXIT to the hypervisor. These translations can be stored in the TLB, and tagged with each guest's virtual machine processor ID (VPID) so that the translations need not be flushed on every virtual machine context switch.

Virtual machine extensions significantly aid a hypervisor in running multiple virtual machines in an isolated fashion with relatively minor performance impacts. Aspects of the present invention leverage this technology to provide a non-intrusive method for maintaining the integrity of a self-modifying executable. For instance, a page fault handler hook is provided that facilitates TLB desynchronization and is made to be compatible with, for instance, modern operating system(s) and/or hypervisor(s). Verification of the contents of code executing in real-time is facilitated by retargeting data access attempts to a separate portion of memory, separate from the portion of memory in which the executable is loaded for execution. In accordance with aspects of the present invention, both low-privilege and high-privilege binaries (such as a System Management Interrupt (SMI) handler written by the BIOS) can be reliably measured to verify a root of trust, for instance during a late launch process for Intel Corporation's Trusted Execution Technology (TXT) trust module.

Aspects of the present invention ensure that measurements of a dynamic application by a measurement facility remain meaningful as data accesses are made to the dynamic application to change the data portion thereof. In order to accomplish this goal, TLB splitting is leveraged for defensive purposes. Aspects of the present invention "split" a target executable into two portions of memory space. For instance, the target executable is loaded into memory and is the "instruction copy" to which instruction accesses are directed. A duplicate of the target executable is created, with the duplicate of the target being the "data copy" to which data accesses are directed. The executable, during execution thereof (i.e. execution of instructions from the instruction copy) will attempt to access the data portion of the target executable. However, in accordance with aspects of the present invention, the data accesses are instead redirected to the data copy. The target executable therefore remains static in memory, since the data accesses (i.e. data writes and reads) are directed to the data copy in a separate portion of memory space.

Figure 3:
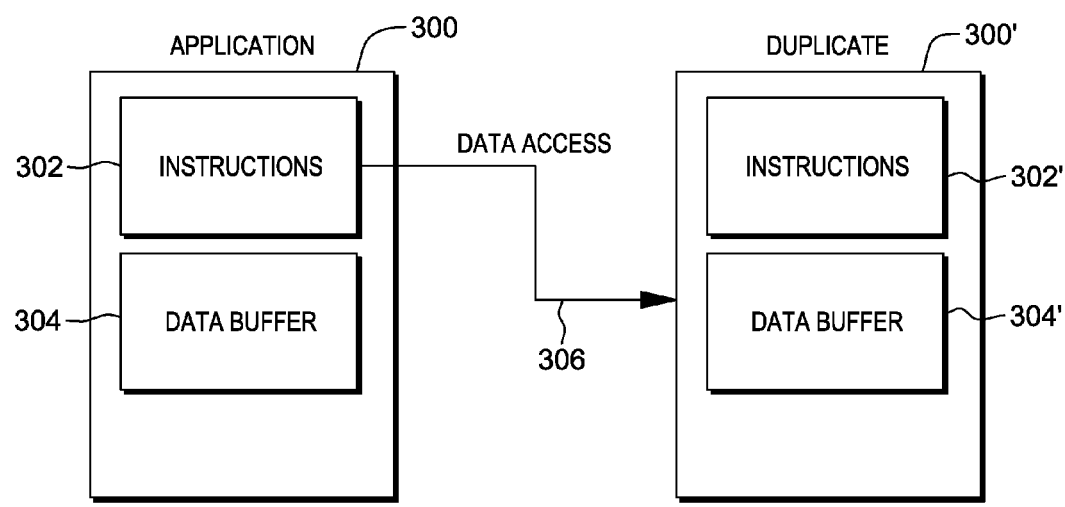
FIG. 3 depicts an example of data access retargeting, in accordance with one or more aspects of the present invention.

FIG. 3 depicts an example of data access retargeting, in accordance with one or more aspects of the present invention. In FIG. 3, self-modifying application 300 includes an instruction portion 302 having one or more instructions, and a data portion 304 serving as a data buffer to which data is read and dynamically written. Instruction portion 302 and data portion 304 are not interlaced in the example of FIG. 3 but, in some examples (such as is depicted in FIGS. 1A & 1B), they are interlaced.

Also depicted in FIG. 3 is duplicate application 300'. Application 300' is a copy of application 300, and therefore includes instruction portion 302' and data portion 304', which are simply copies of instruction portion 302 and data portion 304. Execution of application 300 proceeds with execution of instructions from instruction portion 302. A data access attempt 306 is initiated by an instruction of instruction portion 302. The data access attempt 306 is addressed (in the instruction) to data portion 304. However, instead of access attempt 306 being directed to data portion 304, the data access attempt 306 is instead retargeted to a separate portion of memory space, and more specifically, to the portion having data buffer 304' of duplicate application 300'. Data portion 304 is not changed by the execution of application 300; application 300 remains static throughout execution thereof. Periodic measurement of some or all of application 300 should therefore (barring any manipulation by external sources) produce a consistent hash across the time period during which the application executes.

Thus, in accordance with one embodiment of the present invention, data access retargeting is provided as part of the process to facilitate trusted execution of a self-modifying executable. An overview of this process is provided with reference to FIG. 4, which is followed by a description of more detailed embodiments.

Figure 4:
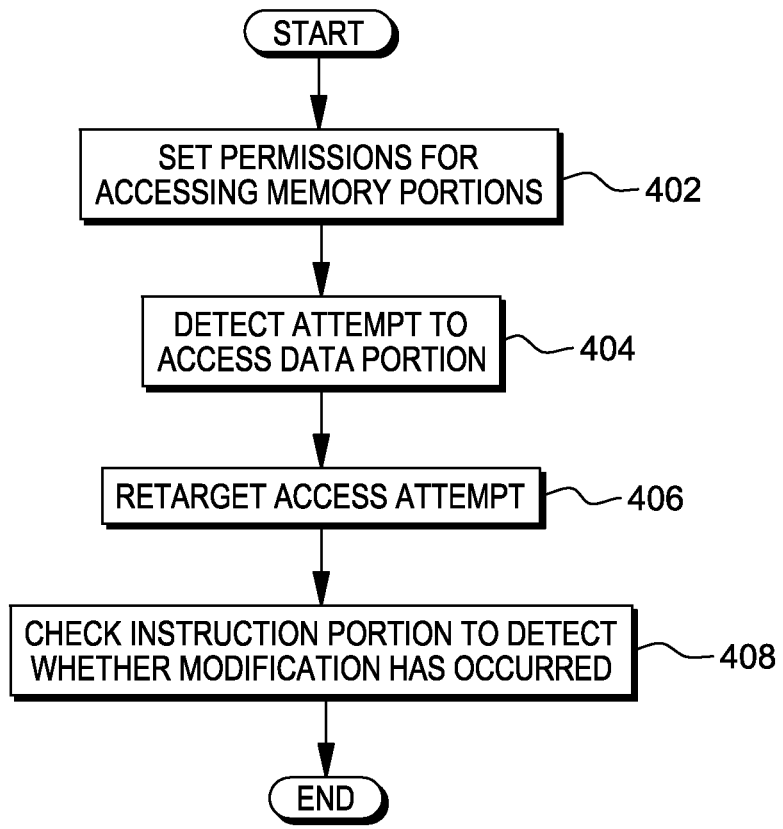
FIG. 4 depicts an example process to facilitate trusted execution of a self-modifying executable, in accordance with one or more aspects of the present invention.

The process of FIG. 4 begins by setting the proper permissions, 402, for accessing the portions of memory to which the instruction accesses are to be directed (e.g., the target application) and to which the data accesses are to be directed (e.g., the data copy). This includes setting permissions for the data portion(s) and the instruction portion(s). More specifically, the permissions for accessing the instruction portion (in the instruction copy of the executable) are set to indicate execution access (e.g., instruction fetch and execution) to that portion is permitted, but data read or write access to that portion is not permitted, and the permissions for accessing the data portion (in the data copy of the executable) are set to indicate data read and data write access to that portion is permitted, but execution access to that portion is not permitted.

Next, an attempt to access the data portion is detected, 404. The attempt is made by the executable and references an address, for instance, of the data portion of the instruction copy of the executable. In one example, this attempt is detected based on a page fault that indicates that the data attempting to be accessed is not currently resident in working memory space.

The data access attempt is retargeted, 406, to a separate portion of memory space (e.g., in which the data copy is loaded), to avoid access and potential modification to the instruction copy. Then, periodically in one example, at least a portion of the self-modifying executable, such as the instruction portion of the target (instruction copy) executable, is checked to detect whether modification thereto has occurred, 408. The retargeting ensures that the executable does not modify on account of its execution the instruction copy from which instructions are read. Instead, the working copy (data copy) of the executable is modified. Modification to any part of the data copy to include a malicious instruction or data, for instance, will fail to compromise the self-modifying executable since the instructions for execution thereof are being accessed from the static instruction copy of the executable.

Embodiments of the present invention are implemented in different ways depending on the subject computing environment. Typically, a processor on which the application executes will include two relevant TLB structures—an ITLB (for caching instruction address translations) and a DTLB (for caching data address translations). In one embodiment (FIGS. 5-7), a modified or augmented page fault handler of an operating system is provided for the retargeting. In this embodiment, the page fault interrupt descriptor table (IDT) entry is hooked and the handler's privileged position enables it to desynchronize the ITLB from the DTLB for certain memory pages. Another embodiment (FIGS. 8-10B) provides hypervisor-based desynchronization of the two caches so that the DTLB points to the data copy and the ITLB points to the code copy.

Figure 5:
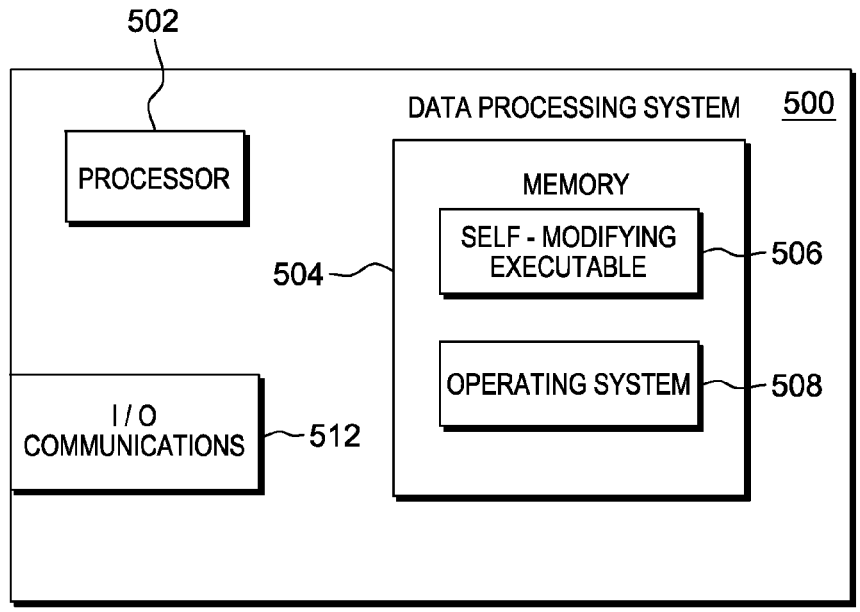
FIG. 5 depicts an example computing environment in which data access retargeting is provided.

FIG. 5 depicts an example computing environment in which data access retargeting is provided. Data processing system 500 includes a processor 502, memory 504, and one or more I/O communications interface components 512 (such as network, graphics, and/or audio controller(s)). Memory 204 includes self-modifying executable 506 loaded for execution by an operating system 508 also resident in memory 506. Processor 502 comprises any appropriate hardware component(s) capable of executing one or more instructions from memory 504, as is appreciated by those having ordinary skill in the art.

Figure 6:
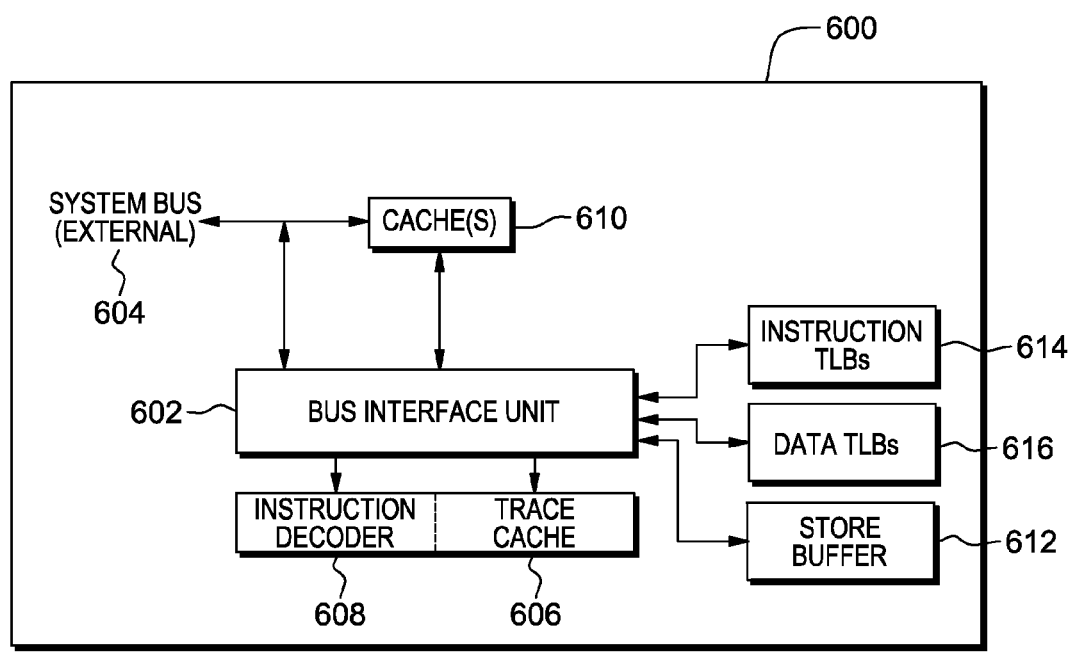
FIG. 6 depicts example hardware architecture of a processor of the computing environment of FIG. 5.

In one example, processor 502 is based on Intel's x86 architecture. FIG. 6 depicts the hardware architecture of one example of an x86 processor. Processor 600 includes a bus interface unit 602 for communicating data across an external system bus 604. As an example, data is communicated to and from physical memory, such as when instructions are fetched from an application loaded for execution in the physical memory, or when data accesses are made to the physical memory. Trace cache 606 stores decoded instructions (decoded by instruction decoder 608) to avoid repeated decoding of the same instruction by instruction decoder 608. One or more caches 610 (such as L1, L2 and L3 caches familiar to those having ordinary skill in the art) cache data and/or instructions—typically the most used data/instructions—for enabling immediate access by the processor. Store buffer 612 is used for stores to system memory and/or caches 610 and sometimes for optimizing the processor's bus accesses. Finally, one or more instruction TLBs (614) and one or more data TLBs (616) are included for caching translations of instruction addresses and data addresses, respectively. Further information about the hardware architecture of an x86 processor is provided in "Intel® 64 and IA-32 Architectures Software Developer's Manual, Combined Volumes: 1, 2A, 2B, 2C, 3A, 3B and 3C", May 2012 (available at http://download.intel.com/products/processor/manual/325462.pdf), which is hereby incorporated herein by reference in its entirety.

Figure 7:
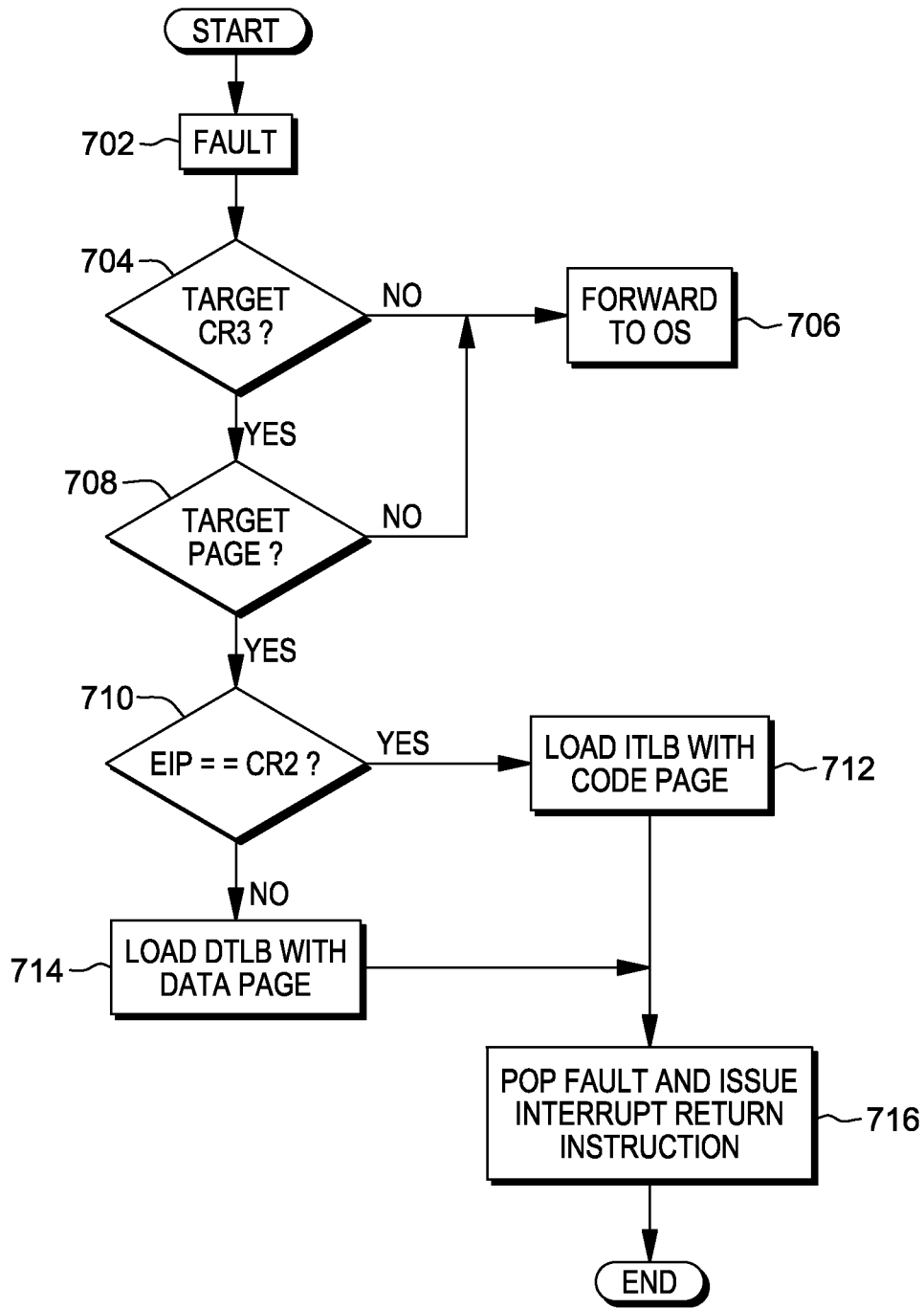
FIG. 7 depicts an example process for data access retargeting in the computing environment of FIG. 5.

FIG. 7 depicts an example process for data access retargeting in the computing environment of FIG. 5. The process is performed, in one example, by a shim provided just in front of an operating systems' page fault handler, so that the shim takes priority in terms of handling a page fault over the operating system's page fault handler. The shim provides TLB desynchronization for a target application in order to target instruction and data accesses to the appropriate portion of memory space. For application other than the target application, the shim will forward the exception to the operating system's handler for normal processing.

Initially, when the self-modifying executable is loaded, separate data and instruction portions are split (for instance, a duplicate copy of the loaded executable is created) and provided in separate pages of memory, and the pages are marked as not present in the TLB. The page permissions indicate immutable executable page(s) (IEP) for the instruction portion (e.g., of the instruction copy) and writable data page(s) (WDP) for the data portion to which data access are to be retargeted (e.g., the data portion of the data copy).

As described above, when virtual memory is paged-out, an indication is placed in a paging structure that marks the page as not being present in memory. When the application attempts to access the non-present page, the operating system will see that the page is not present (i.e. paged-out) and a fault is raised to the operating system for handling the fault, i.e. to load the contents of the page back into memory. The processing of the shim according to this embodiment will adjust the paging structures to show the target page (one to which the access attempt is to be directed) as paged-in and adjust the physical address in the translation of the requested address to point to the physical address of the IEP or WDP. Once the paging structures have been updated, the translation can be loaded into the proper TLB. The shim can then alter the paging structures to once again show the target page as not present and return control to the faulting application, without invalidating the TLB entry (thereby desynchronizing the paging structures from the TLB).

The process of FIG. 7 begins upon detection of a page fault 702, alerting the shim of the data access attempt. The process checks whether the control register (CR3) contains the process ID of the target executable, 704, i.e. the self-modifying executable for which data access retargeting is being performed. Each executing process is identified by its process ID; the checking determines whether the page fault is due to the application for which the desynchronization is being performed. If not, the fault is forwarded as a normal page fault to the operating system, 706. If the ID in CR3 is the ID of the target application, the process proceeds by checking whether the page (for which the page fault was generated) is a page that is being desynchronized, 708. In other words, it is determined whether the page for which the access is attempted by the self-modifying executable is a page containing at least some of the data portion of the executable or the instruction portion of the executable. If not, the fault is, as before, forwarded as a normal page fault to the operating system, 706.

If the page is a target page, then at 710, it is determined whether the faulting address is an instruction address or a data address by comparing the contents of the exception return address (EIP) register and the CR2 control register to determine whether the contents are equal. If so, then an adjustment is made to the paging structure(s) to show the target page as paged-in; a physical address translated, in an entry in a paging structure, from a virtual address is adjusted to point to the physical address of the IEP (instruction copy); and the instruction TLB is loaded with the translation pointing to the physical address of the code (instruction) page, 712.

If instead at 710, it is determined that the contents of the EIP register and the CR2 control register are not equal, then an adjustment is made to a paging structure(s) to show the target page as paged-in; a physical address translated, in an entry in a paging structure, from a virtual address is adjusted to point to the physical address of the WDP (data copy); and the data TLB is loaded with the translation pointing to the physical address of the data page, 714.

In one example, the TLB is loaded with the proper translation simply by the shim accessing the first byte in the page for data accesses, or by temporarily overwriting the first byte of the page with the return instruction (0xC3) and CALLing that page before restoring the correct first byte. These actions load the TLB (DTLB or ITLB) with the correct translation, after which time the shim can then re-alter the paging structure(s) to once again show the target page as not present, without invalidating the TLB entry (and thus desynchronizing the paging structures from the TLB).

Returning to the process of FIG. 7, the page fault containing the error code and other information about the fault is then popped from the fault stack or other queue of faults awaiting handling, and the interrupt return instruction is issued to return from the interrupt-handler procedure back to the application, 716, bypassing the operating system's page fault handler.

The above process can be used for TLB desynchronization to split memory page accesses for arbitrary kernel and user-mode pages with little or no noticeable performance overhead. This approach is feasible for many practical use cases, including verifying the integrity of running kernel and System Management Interrupt (SMI) handlers, as examples.

In a further embodiment, the processor architecture incorporates a change in the TLB architecture to add a shared TLB ("S-TLB or STLB") (an example of such an architecture is the Core™ i7 series of processors offered by Intel Corporation). The STLB functions as a shared level-2 cache for both the data and instruction TLBs. When either of the I-TLB or D-TLB is full, the least-recently-used translation is evicted and replaced with a new translation. In these newer processor architectures, the evicted translation is moved to the S-TLB in the case that it will be needed again shortly, where it can rapidly be replaced without re-walking the paging structures. The newer TLB architecture is designed for improved performance, however it violates the separation between the ITLB and DTLB relied upon by the process above. In a system with no S-TLB, when the CPU faults due to a missing TLB entry, it will request that the page fault handler (PFH) to fill in the correct value. With the S-TLB, the faulting TLB (I or D) will check the S-TLB first, and use that value instead of faulting to the PFH to get the desynchronized value.

Figure 8:
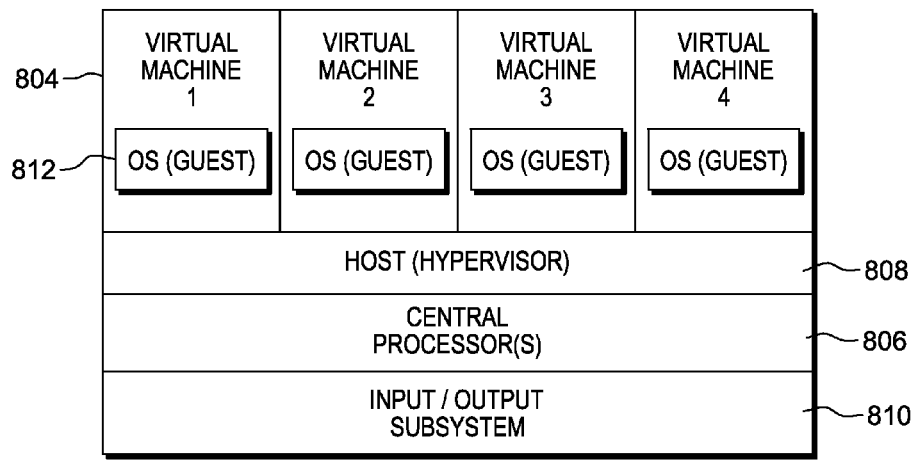
FIG. 8 depicts another example computing environment in which data access retargeting is provided.

To address this, a VMX hypervisor is implemented for incorporation into a virtual machine computing environment. FIG. 8 depicts such an example computing environment in which data access retargeting is provided. Computing environment 800 includes, for instance, one or more virtual machines 804, one or more central processors 806, at least one host 808 (e.g., a control program, such as a hypervisor), and an input/output subsystem 810, each of which is described below. In this example, the virtual machines and host are included in memory.

The virtual machine support of computing environment 800 provides the ability to operate large numbers of virtual machines, each capable of hosting a guest system, for instance a guest operating system 812, such as a Windows®-based operating system offered by Microsoft Corporation, Redmond, Wash. Each virtual machine 804 is capable of functioning as a separate system. That is, each virtual machine can be independently reset, host a disparate guest operating system, and operate with different programs. An operating system or application program running in a virtual machine appears to have access to a full and complete system, but in reality, only a portion of it is available.

The physical resources of the computing environment 800 (e.g., CPUs, memory, I/O devices, etc.) are owned by host 808, and the shared physical resources are dispatched by the host to the guest systems, as needed, to meet their processing demands. The interactions between the guest systems and the physical shared machine resources are controlled by the host, since the large number of guests typically, though not always, precludes the host from simply partitioning and assigning the hardware resources to the configured guests.

Central processors 806 are physical processor resources that are assignable to a virtual machine. For instance, virtual machine 804 represents all or a share of a physical processor resource 806 that may be dynamically allocated to the virtual machine. Virtual machines 804 are managed by host 808, and thus host 808 manages execution of the guest systems including application executed within/by the guest systems. As examples, the host may be implemented as Type-1 (native), running directly on host hardware, such as on processors 806, or may implemented as Type-2 (hosted), running within a host operating system executing on the machine.

Input/output subsystem 810 directs the flow of information between devices and main storage. It is coupled to the computing environment 800, in that it can be part of the computing environment or separate therefrom. The I/O subsystem relieves the central processors of the task of communicating directly with the I/O devices coupled to the computing environment and permits data processing to proceed concurrently with I/O processing.

In one embodiment, the host and processor hardware/firmware interact with each other in a controlled cooperative manner in order to process guest operating system operations without requiring transfer of control from/to the guest operating system and the host. Guest operations can be executed directly without host intervention, in some instances, wherein guest instructions and interruptions are processed directly, until a condition requiring host attention arises.

As used herein, firmware includes the hardware-level instructions and/or data structures used in implementation of higher level machine code. In one embodiment, it includes, for instance, proprietary code that includes trusted software specific to the underlying hardware and controls operating system access to the system hardware.

Figure 9:
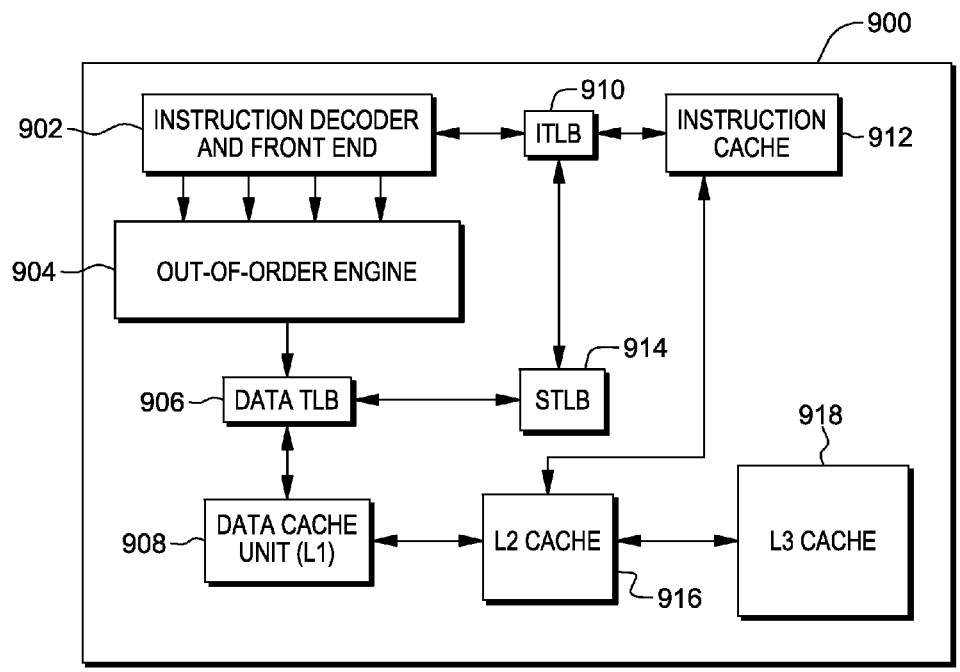
FIG. 9 depicts example architecture of a processor of the computing environment of FIG. 8.

FIG. 9 depicts an example architecture of a processor of the computing environment of FIG. 8. The processor architecture of FIG. 9 implements the revised TLB architecture discussed above in which a shared TLB is added. An example of the processor architecture of FIG. 9 is the Nehalem architecture offered by Intel Corporation.

In FIG. 9, processor 900 includes an instruction decoder and front end component 902 in communication with an out-of-order execution engine 904. Out-of-order execution engine monitors upcoming instructions and (potentially) reorders them to best optimize the use of the processor's processing pipeline, while maintaining data integrity. Instruction decoder and front end component is in communication with instruction TLB 910 for caching instruction address translations for cached instructions of instruction cache 912. Out-of-order execution engine 904 is in communication with data TLB 906 for caching data address translations. Level-1 (908), level-2 (916) and level-3 (918) caches provide data and/or instruction caching. As described earlier, shared TLB 914 is an upper-level cache (with respect to the ITLB 910 and DTLB 906), caching both data and instruction translations that are evicted from ITLB 910 and DTLB 906.

In embodiments in which the processor includes an STLB, such as in the example processor of FIG. 9, virtual machine extension functionality is leveraged, which also enables bypass of the guest operating system memory manager(s). Because the hypervisor executes on the processor at a higher privilege level than do the guest systems, including operating system(s) running on the guest systems, memory management at the hypervisor level enables manipulation of memory and paging structures without the guest systems being aware that such manipulations occur.

Embodiments presented below are described with reference to Intel Corporation's VMX technology, though it will be appreciated by those having ordinary skill in the art that principles disclosed herein apply analogously to other virtualization technologies.

The hypervisor (808 of FIG. 8), in one example, supports Intel's Extended Page-Table (EPT) and Virtual Processor Identifiers (VPID) mechanisms. EPT supports the virtualization of physical memory by treating guest-referenced memory addresses (which would otherwise be considered physical addresses) as guest-physical addresses, and translating the guest-physical addresses into physical (actual) addresses by way of EPT paging structures. EPT paging structures can point the guest-physical addresses to the identical machine physical addresses (an identity map). The EPTs enable the processor and the memory management system in the hardware to perform almost all the memory management for supporting multiple guest systems. By the identity map, the guest system assumes that its access is made to the guest-physical address, however the accesses, unbeknownst to the guest system, are actually directed via EPT to an actual physical address of the machine.

EPT provides the hypervisor with more granular access controls over guest access to each page, permitting read-only, execute-only and read/write paging permissions. The processor TLBs can also cache EPT translations. If the TLB is primed with split entries, each having different permissions, the TLB would not merge these into the S-TLB, since otherwise it would violate the security of the EPT permissions. So, for instance, the I-TLB will not load entries from the S-TLB which have no execute permissions and the D-TLB will not load entries which have no read/write permission. To prevent the TLB entries from being invalidated, Intel's VPID is supported in the hypervisor. VPID is Intel's extended cache architecture that enables VMX transitions to occur without having to flush the TLBs.

The combination of the EPT and VPID technologies permits a guest operating system to manage memory as if the hypervisor were not present. It also can be leveraged by the hypervisor to mark certain physical addresses as non-present in EPT without the operating system's memory manager becoming aware of the modification. With the inclusion of EPT and VPID support into the hypervisor, the paging out process can be done in the EPT structures and retargeting can be moved to the virtual machine exit (VMEXIT) handler for handling an EPT fault, which occurs when a requested page is not present or when permissions for the page do not match the access type being requested.

The hypervisor does not prime the TLB itself, however. With VPID technology, the TLB entries are tagged with (and only accessible to) the identifier of the priming virtual machine, or 0 in the case of the hypervisor. Therefore, in accordance with an aspect of the present invention, the hypervisor modifies the paging structures upon the EPT fault, and sets a guest trap flag, e.g., in the EFLAGS register, which causes the processor to trap after the virtual machine executes the instruction that performs the data or instruction access. The hypervisor is then configured to VM EXIT on the trap exception. A trap flag handler in the hypervisor then disables the trap flag and resets the EPT paging structures to non-present, leaving the TLB primed with the cached VPID-tagged paging structure entry, thus allowing access of the same type (either data or instruction) as was initially requested for the page, but resulting in another trap to the EPT handler if an access of the other type is requested.

Figure 10A:
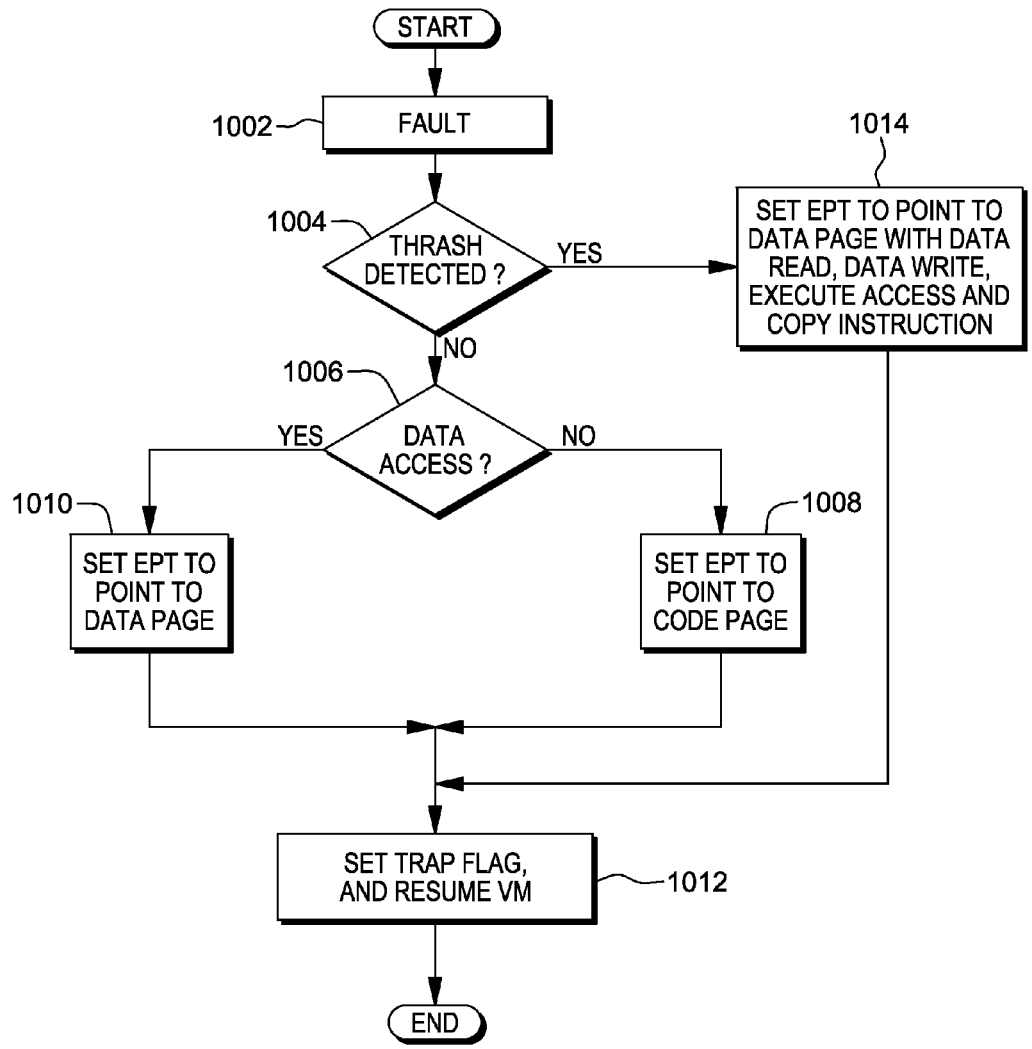
FIGS. 10A and 10B depict an example of data access retargeting in the computing environment of FIG. 8, in accordance with one or more aspects of the present invention.
Figure 10B:
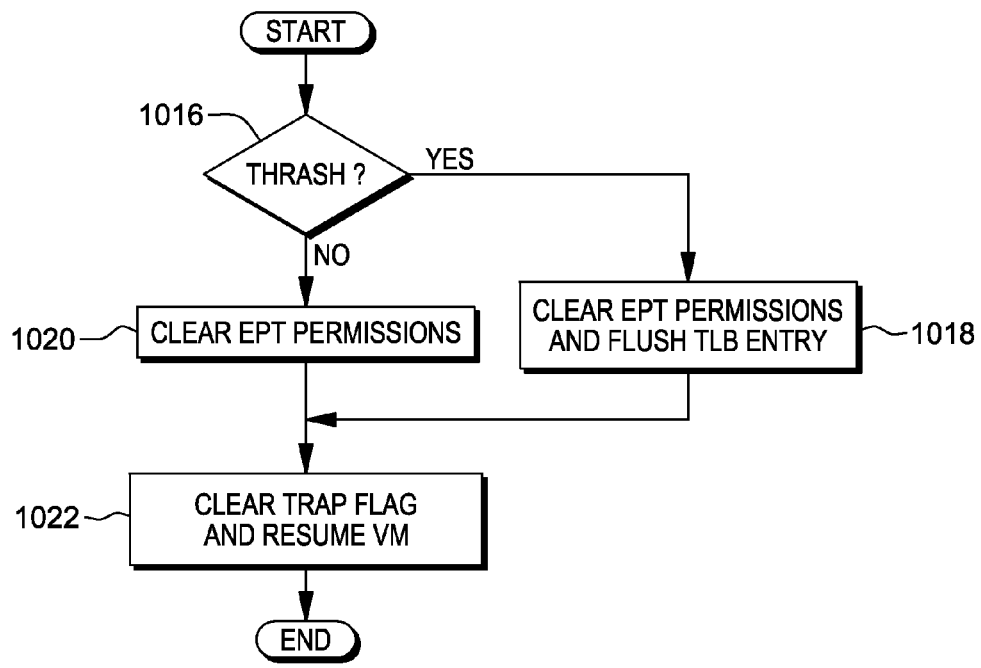

Data access retargeting is thereby provided in a computing environment incorporating a hypervisor and one or more virtual machines. FIGS. 10A and 10B depict an example of data access retargeting, in accordance with one or more aspects of the present invention.

Initially, as before, some preparation is performed with respect to the EPT entries for the portions of memory that include the instruction and data portions for access by the self-modifying executable. The hypervisor (or shim thereof) marks the data pages (those that include the separate portion of memory space to which the data access attempts are to be directed) in the EPTs as read and write only (and unable to execute) and marks the instruction pages (those that include the portion of memory space to which the instruction access attempts are targeted) execute only (and not read/write). The TLB caches the EPT translations (guest-physical address to physical address) but does not merge old cached translations into the STLB, since the conflict of the permissions, if merged, would be a security vulnerability. Additionally, since the hypervisor does not prime the TLB for the guest system that executes the self-modifying executable, the hypervisor marks in the EPT the target pages as being not present in memory. Again, this is allowed without causing complications for the guest operating system's memory manager because the hypervisor executes at a higher privilege level than the guest system. Marking the pages not present causes the guest system to pull into the TLB the appropriate EPT entry having the appropriate permissions which are set by the hypervisor.

Referring to FIG. 10A, a fault, in this case an EPT VM EXIT, occurs, 1002. An EPT VM EXIT is similar to a page fault by the guest system to the hypervisor, and occurs when the page to which access is attempted is not present, or when permissions for the requested page do not match the access type being requested. The fault is caused, in one example, by the guest system attempting to perform an operation, such as a fetch of a next instruction for execution, or to execute an instruction that causes a data access.

In any case, the hypervisor detects the fault as an attempt to access a data portion or an instruction portion of the self-modifying executable. The process then determines whether a thrash is detected, 1004 (a thrash is explained below). Assuming no thrash is detected, the process determines whether the access type is a data access to the data portion of the self-modifying executable, 1006. In one example, the access type is determined based on an indication in a field included in guest system exit information that is provided to the hypervisor upon a guest exit.

If the access type is not a data access, the access is an instruction access—an attempt to access and execute an instruction from the instruction portion of the self-modifying executable. In this case, the EPT entry is set to point to the appropriate code memory page, 1008. If instead at 1006 it is determined that the access type is a data access to the data portion of the self-modifying executable, the EPT is set to point to the appropriate data page, 1010, i.e. the page in the separate memory space which has the data portion to which the access is to be retargeted, such as the data portion of a copy of the self-modifying executable. In either case, setting the EPT to point to the appropriate page includes, in one example, modifying an entry in the EPT to indicate the appropriate page, and more specifically, modifying the machine physical address, indicated in the EPT entry and translated from the guest-physical address (the address referenced by the guest system) to indicate the machine address of the appropriate memory page to which the access attempt is to be directed.

After the EPT is set to point to the appropriate page (1010 or 1008), a trap flag is set (e.g., in the EFLAGS register) and resumption of execution of the guest system is initiated, 1012, for instance by way of a VMRESUME command. Setting the trap flag will initiate a trap of the guest system back to the hypervisor after performance of the operation, for instance performance of the operation to access the data or instruction portion, which caused the VM EXIT (1002) to occur. By setting the trap flag, the guest system will trap to the hypervisor for trap handling described below with reference to FIG. 10B.

Returning to 1004, in some cases a thrash is detected after a VM EXIT (1002). Thrashing occurs when at least some of the memory space holding the instruction portion and at least some of the memory space holding the data portion are included within a memory page being accessed. When both data and instructions of the application are on a same page, the TLB fetch/update behavior is to replace the entities in the S-TLB rather than to allow two disparate entries for the same page to be used.

Based on the thrash condition, the EPT is set to point to the data page and the instruction that the guest system is attempting to execute is copied to the data page at an appropriate location in the separate portion of memory space. Additionally, the permissions are set on the page to indicate data read, data write, and instruction execution access is permitted. Processing then continues to 1012 where, as before, the trap flag is set and resumption of guest system execution is initiated.

The fault handling processing of FIG. 10A sets the trap flag after setting up the EPT to point to the appropriate data page. The trap causes a trap, in one example, only after the operation attempting to be performed (which caused the fault) is performed, which is the typical situation. However, in a thrash condition, the thrashing prevents the guest system from performing the operation in the first place. For instance, if the operation is an instruction access, the instruction is never accessed as long as the thrashing continues. Thus, in one example, the thrashing is detected by determining whether two sequential EPT VM EXITS occur without a trap VM EXIT.

Performance of the operation that initiated the access attempt will perform the access to the data portion or the instruction portion. Thereafter, the set trap flag will cause a trap VM EXIT to a trap handler of the hypervisor (the provided shim in one embodiment), which performs the processing of FIG. 10B. First, if a thrash condition is present, 1016, then the permissions in the EPT entry indicating data read, data write, and instruction access are cleared (to indicate no data read, data write, or instruction access is permitted), and the cached version of the paging structure entry is flushed from the TLB, 1018. Flushing the TLB of the cached entry is performed to clear the permissions on the page to maintain the secure nature of the memory space having the data copy.

If at 1016 a thrash condition is not present, then the permissions in the EPT entry indicating data read/write access (but not instruction access) or indicating instruction access (but not data read/write access) for the appropriate memory page are cleared, 1020. However, in this case, the cached entry in the TLB is not flushed, so that the TLB remains primed with the desynchronized entry.

Next, the trap flag is cleared and resumption of execution of the guest system is initiated (e.g., by a VM RESUME command) (1022). As long as the cached entry remains non-evicted from the TLB, the TLB has the appropriate address entry and permissions to permit continued instruction (or data) access to the appropriate page, so long as the access type remains the same.

In this manner, appropriate data and instruction execution access targeting is provided wherein a hypervisor will setup an EPT entry with an appropriate physical address and access permissions to which the data or instruction access attempt is to be directed. Then, a guest system will cache the entry and complete the access to the appropriate portion of memory space, which occurs when performing an operation such as executing an instruction to perform the data access, or fetching the next instruction for execution. After performance of the operation, a trap to the hypervisor enables the hypervisor to reset the permissions on the EPT entry. The cached entry remains in the TLB so long as the same type of access by the guest system is performed. In the case of a thrash condition, permission for accessing the appropriate memory page temporarily enables access and execution of the next instruction for execution from the data page, and the trap handler subsequently removes these temporary permissions, causing, in essence, single-stepping through these thrash points.

In some environments, when a dynamic application executes, the physical pages of the data copy of the application would change. This can be caused, for instance, by the operating system marking all code pages (even if they are marked as writable) as read-only, and performing, when modifications are detected, a copy-on-write (COW) operation. This optimization, incorporated into some Windows® operating systems, allows the operating system to run multiple instances of the same application without wasting memory on duplicate, rarely changing code pages. In order to detect this remapping of the application's pages, the hypervisor could be configured to walk the operating system's paging structures with each process/context switch (e.g., each time the CR3 register is changed), and if the physical addresses in the paging structures are different for the target application, the hypervisor could update its list of pages to split. Due to this feature, the read-only executable copy is kept unchanged, and the data copy which was made is removed and replaced with the operating system copy-on-write version.

By the above, data accesses by a self-modifying executable during execution thereof to its own data portion are retargeted to a separate portion of memory space, separate from the portion of memory space in which the application is loaded for execution. The retargeting of these data accesses prevents the self-modifying executable from modifying the memory space in which it is loaded, thus allowing it to remain static (notwithstanding any outside modification). The retargeting facilitates meaningful measurement of the self-modifying executable for ensuring the integrity of some or all of the application.

In one example, a measurement thread is initiated upon the initiation of application execution. The measurement thread can periodically measure (i.e. checksum or hash) some or all of the application in order to determine whether modification to the application has occurred. This is described and depicted with reference to FIGS. 11 and 12.

Figure 11:
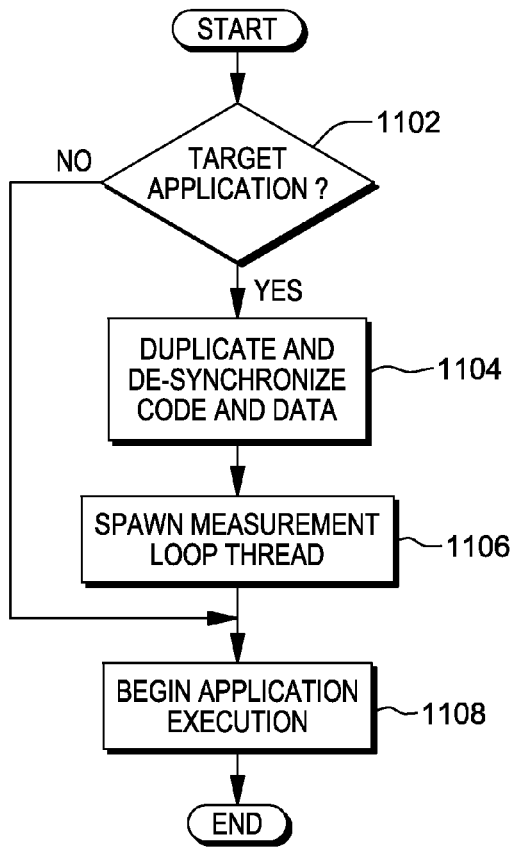
FIG. 11 depicts an example process for initiating execution of a self-modifying executable, in accordance with one or more aspects of the present invention.

FIG. 11 depicts an example process for initiating execution of a self-modifying executable, in accordance with one or more aspects of the present invention. The process begins by determining whether the application attempting to be initiated comprises a target application (i.e. one for which periodic measurement is desired), 1102. If not, the process proceeds to 1108 which begins application execution. However, if the application is a target application for which periodic measurement is desired, then the application is duplicated to desynchronize the code portion from the data portions that will be accessed during execution of the application, 1104. For instance, the application is copied to a separate portion of memory space, separate from the memory space in which the application is loaded for execution, and one or more paging structures are setup such that attempts to access the instruction portion of the application are targeted to the memory space in which the application is loaded, but attempts to access the data portion of the application are retargeted to a data portion of the duplicate application in the separate portion of memory space. A measurement loop thread is spawned, 1106, an example processing of which is described and depicted with respect to FIG. 12, and the process proceed to 1108 which begins application execution.

Figure 12:
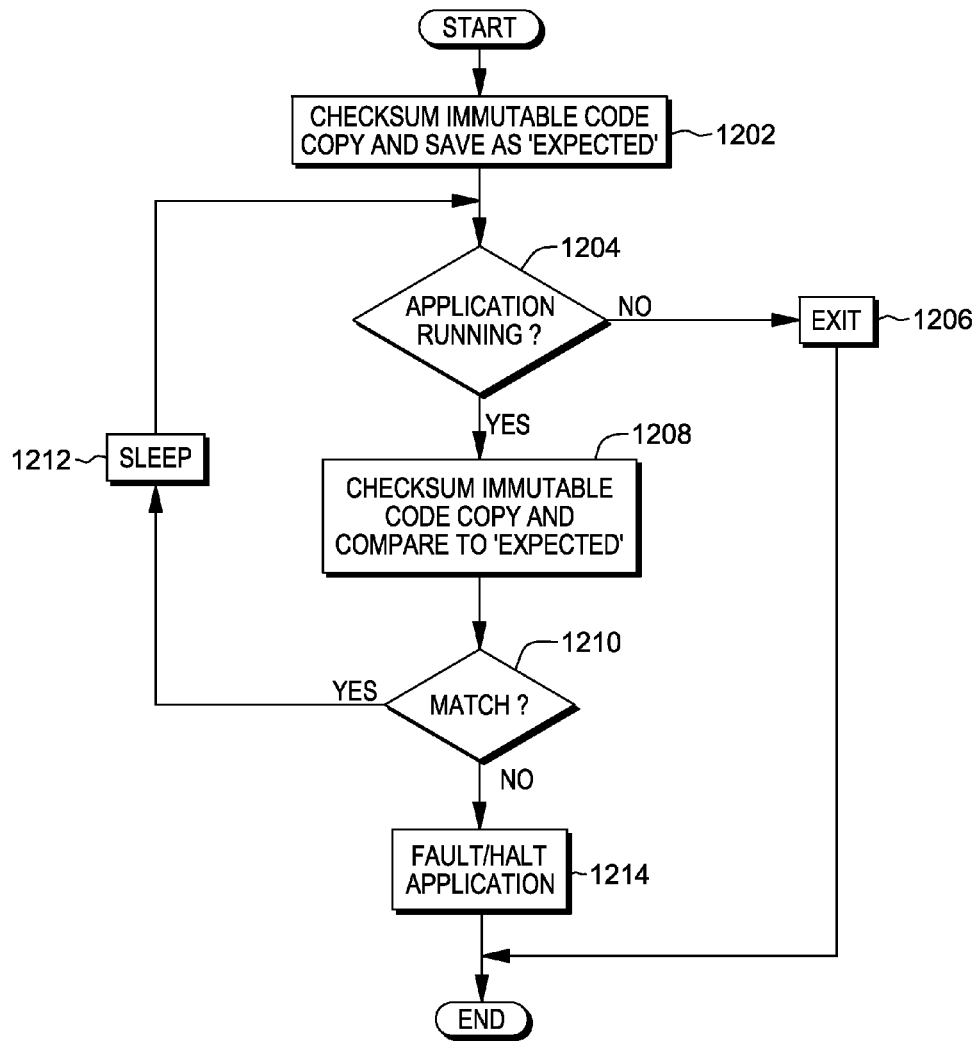
FIG. 12 depicts one example of processing by a measurement loop thread to detect whether modification to a self-modifying executable has occurred, in accordance with one or more aspects of the present invention.

FIG. 12 depicts one example of processing by a measurement loop thread to detect whether modification to the self-modifying executable has occurred, in accordance with one or more aspects of the present invention. Initially, and in one example just before execution of the application begins, a checksum (hash) of the immutable code copy (i.e. the self-modifying executable, rather than its duplicate data copy), is determined and saved as an expected checksum, 1202. The expected checksum or hash is considered to represent the original, secure state of the application. In some embodiments, the entire immutable code copy is checksummed, while in others, only a portion of the immutable code copy is checksummed. For instance, if it is possible to checksum only the instruction portion of the immutable code copy, then the expected checksum could be taken across only this portion of the application.

Processing proceeds to 1204 where it is determined whether the application is running. If not, measurement is finished and the process exits 1206. If the application is running, then the immutable code copy (or the portion thereof, if the expected checksum was taken across only the portion thereof) is checksummed, the checksum is compared to the expected checksum, 1208, and it is determined whether the checksums match, 1210. If this checking indicates that the checksums match, it indicates that the immutable code copy (or the portion thereof) has not been modified. Since execution of the program proceeds from the instructions of the immutable code copy, determining that this immutable code copy has not been modified provides assurance that the execution is proceeding consistent with the original state of the application, rather than, for instance, some modified state that was modified to include malicious code or other security compromise.

If the checksums match, the process sleeps 1212 for an amount of time before returning to 1204 and repeating the above. The amount of time which the thread sleeps is fully customizable. Ideally, it will be a short enough period of time that an attacker could not modify the immutable code copy, execute an instruction therefrom, and reset the immutable code copy, all before the thread awakens to repeat the checking. In one example, the sleep period could be one-tenth of a second without causing a significant performance impact, but providing near immediate indication of an attack (see 1214 below). Alternatively, the amount of time could be greater or lesser than one-tenth of a second, and/or could be made to dynamically change during the running of the thread.

If the checksums do not match, then this indicates that the immutable code copy (or portion thereof) was modified, resulting in the mismatching checksums. The thread, upon detecting this mismatch, issues a fault or halts execution of the self-modifying executable, 1214. Additionally or alternatively, various other actions could be performed by the thread upon detecting a mismatch, depending on how an administrator of the computing environment wishes to handle modification to the immutable code copy.

In addition to the above, the portion of the hypervisor responsible for the retargeting in FIGS. 10A and 10B (the shim), can itself include data and instruction portions that can be measured periodically to ensure that the shim has not been subjugated. In one example, the shim is measureable by another piece of hardware or software, or is self-measureable. Self-measureable means that the shim can measure its own instruction portion to ensure that modification thereto has not occurred. For example, one or more instructions of the instruction portion of the shim can execute to perform the checking of the instruction portion of the shim. Measurability of the shim is important from a trusted computing perspective. Though the shim, through its data access retargeting, facilitates meaningful measurement of the self-modifying executable as described above, it should itself be measureable, by a hardware root of trust for instance, to provide a more complete assurance of the entire system.

Measurement information on both the self-modifying executable and the shim can be presented to an administrator on a configurable interval, such as several times per second, to provide notification that neither the dynamic application nor the retargeting mechanism has been subjugated. In one example, the shim performs the measurement of the dynamic application and performs self-measurement on an instruction portion of itself, and provides indications to the administrator or a hardware root of trust as to the integrity of both the dynamic application and the shim.

Described herein is a fault handler and hypervisor constructed for splitting and appropriately targeting data and instruction accesses for an application, regardless of whether the application executes from user space or a more privileged memory space (such as kernel space). The performance impact of the retargeting is typically minimal (<2% overhead), and the advantages of transparently enabling periodic measurement of a dynamic executable saves costs and capabilities for greatly improving the trustworthiness of a computer system and self-modifying executables executing thereon.

Those having ordinary skill in the art will recognize that aspects of the present invention may be embodied in one or more systems, one or more methods and/or one or more computer program products. In some embodiments, aspects of the present invention may be embodied entirely in hardware, entirely in software (for instance in firmware, resident software, micro-code, etc.), or in a combination of software and hardware aspects that may all generally be referred to herein as a "system" and include circuit(s) and/or module(s).

In some embodiments, aspects of the present invention may take the form of a computer program product embodied in one or more computer readable medium(s). The one or more computer readable medium(s) may have embodied thereon computer readable program code. Various computer readable medium(s) or combinations thereof may be utilized. For instance, the computer readable medium(s) may comprise a computer readable storage medium, examples of which include (but are not limited to) one or more electronic, magnetic, optical, or semiconductor systems, apparatuses, or devices, or any suitable combination of the foregoing. Example computer readable storage medium(s) include, for instance: an electrical connection having one or more wires, a portable computer diskette, a hard disk or mass-storage device, a random access memory (RAM), read-only memory (ROM), and/or erasable-programmable read-only memory such as EPROM or Flash memory, an optical fiber, a portable compact disc read-only memory (CD-ROM), an optical storage device, a magnetic storage device (including a tape device), or any suitable combination of the above. A computer readable storage medium is defined to comprise a tangible medium that can contain or store program code for use by or in connection with an instruction execution system, apparatus, or device, such as a processor. The program code stored in/on the computer readable medium therefore produces an article of manufacture (such as a "computer program product") including program code.

Figure 13:
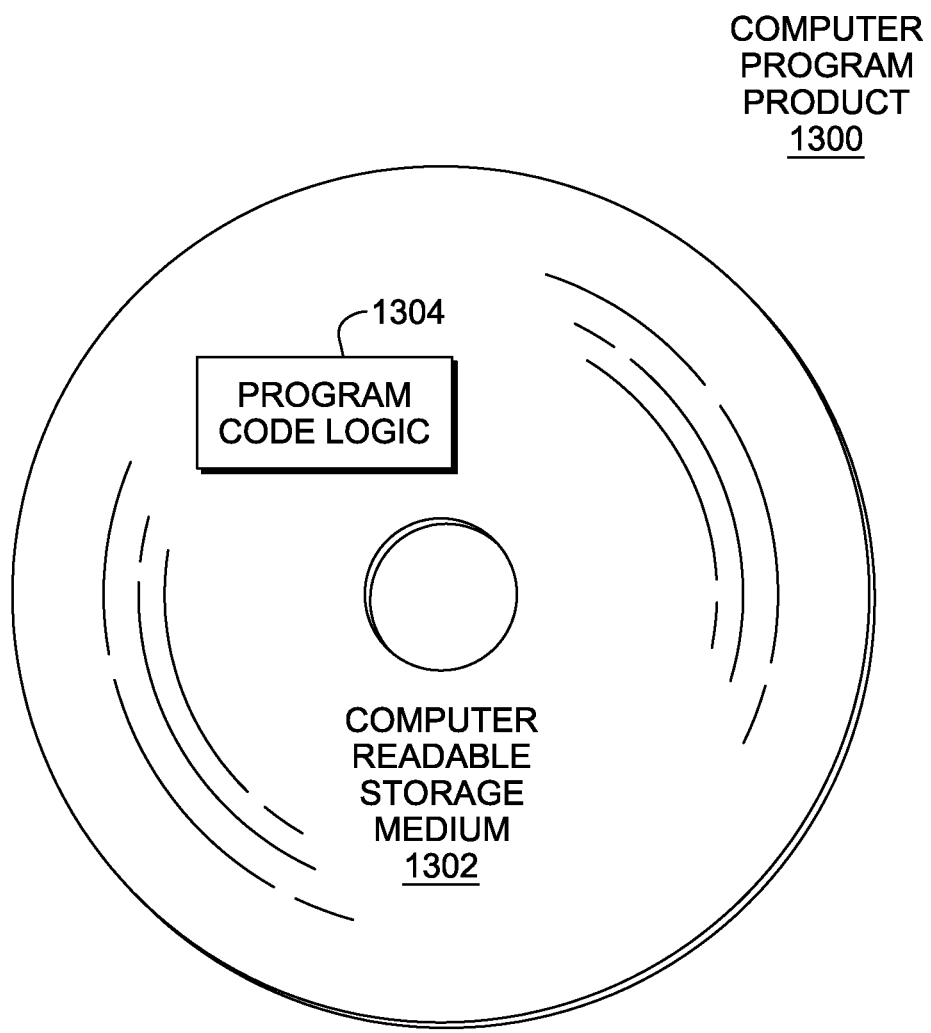
FIG. 13 depicts one embodiment of a computer program product incorporating one or more aspects of the present invention.

Referring now to FIG. 13, in one example, a computer program product 1300 includes, for instance, one or more computer readable media 1302 to store computer readable program code means or logic 1304 thereon to provide and facilitate one or more aspects of the present invention.

Program code contained or stored in/on a computer readable medium can be obtained and executed by a data processing system (computer, computer system, etc. including a component thereof) and/or other devices to cause the data processing system, component thereof, and/or other device to behave/function in a particular manner. The program code can be transmitted using any appropriate medium, including (but not limited to) wireless, wireline, optical fiber, and/or radio-frequency. Program code for carrying out operations to perform, achieve, or facilitate aspects of the present invention may be written in one or more programming languages. In some embodiments, the programming language(s) include object-oriented and/or procedural programming languages such as C, C++, C#, Java, etc. Program code may execute entirely on the user's computer, entirely remote from the user's computer, or a combination of partly on the user's computer and partly on a remote computer. In some embodiments, a user's computer and a remote computer are in communication via a network such as a local area network (LAN) or a wide area network (WAN), and/or via an external computer (for example, through the Internet using an Internet Service Provider).

In one example, program code includes one or more program instructions obtained for execution by one or more processors. Computer program instructions may be provided to one or more processors of, e.g., one or more data processing system, to produce a machine, such that the program instructions, when executed by the one or more processors, perform, achieve, or facilitate aspects of the present invention, such as actions or functions described in flowcharts and/or block diagrams described herein. Thus, each block, or combinations of blocks, of the flowchart illustrations and/or block diagrams depicted and described herein can be implemented, in some embodiments, by computer program instructions.

The flowcharts and block diagrams depicted and described with reference to the Figures illustrate the architecture, functionality, and operation of possible embodiments of systems, methods and/or computer program products according to aspects of the present invention. These flowchart illustrations and/or block diagrams could, therefore, be of methods, apparatuses (systems), and/or computer program products according to aspects of the present invention.

In some embodiments, as noted above, each block in a flowchart or block diagram may represent a module, segment, or portion of code, which comprises one or more executable instructions for implementing the specified behaviors and/or logical functions of the block. Those having ordinary skill in the art will appreciate that behaviors/functions specified or performed by a block may occur in a different order than depicted and/or described, or may occur simultaneous to, or partially/wholly concurrent with, one or more other blocks. Two blocks shown in succession may, in fact, be executed substantially concurrently, or the blocks may sometimes be executed in the reverse order. Additionally, each block of the block diagrams and/or flowchart illustrations, and combinations of blocks in the block diagrams and/or flowchart illustrations, can be implemented wholly by special-purpose hardware-based systems, or in combination with computer instructions, that perform the behaviors/functions specified by a block or entire block diagram or flowchart.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

What is claimed is:

1. A method to facilitate trusted execution of a self-modifying executable, the method comprising:
   detecting, by a hypervisor managing execution of a guest system on a processor, an attempt by the guest system to access a data portion of the self-modifying executable during execution of the self-modifying executable, the self-modifying executable comprising the data portion for storing data to be accessed during execution of the self-modifying executable and an instruction portion comprising instructions for execution of the self-modifying executable; and
   retargeting, by the hypervisor, the attempt to access the data portion to a separate portion of memory space, separate from another portion of memory space in which the self-modifying executable is loaded for execution.

2. The method of claim 1, wherein the retargeting comprises modifying, by the hypervisor, an entry in a paging structure to indicate a memory page that includes at least a portion of the separate portion of memory space, wherein the retargeting directs the attempt to access the data portion to the memory page.

3. The method of claim 2, wherein the paging structure comprises a page table, wherein the entry comprises a machine physical address translated from a guest physical address, and wherein the modifying modifies the machine physical address to indicate an address of the memory page to which the attempt is directed.

4. The method of claim 1, wherein the separate portion of memory space is included in at least one memory page, and wherein the method further comprises, prior to the detecting, indicating by the hypervisor in a paging structure permissions for accessing, by the guest system during execution of the self-modifying executable, each memory page of the at least one memory page, wherein the permissions for a memory page of the at least one memory page indicate data read and data write access, but not instruction access by the guest system.

5. The method of claim 4, wherein the attempt to access the data portion is detected based on an attempt to perform an operation by the guest system, wherein execution of the guest system is halted based on the attempt to perform the operation, and wherein the retargeting comprises:

setting a trap flag to initiate a trap of the guest system to the hypervisor after performance of the operation by the guest system;

determining, by the hypervisor, a memory page of the at least one memory page to which the access attempt is to be targeted, and performing a modification to an entry in the paging structure to indicate the determined memory page to which the access attempt is to be targeted;

initiating resumption of execution of the guest system, wherein the guest system performs the operation and wherein the access to the data portion is targeted to the determined memory page based on the modification to the entry in the paging structure; and based on detecting the trap of the guest system to the hypervisor after performance of the operation, clearing at least one permission of the permissions indicated in the paging structure for accessing, by the guest system, the memory page, and unsetting the trap flag.

6. The method of claim 5, wherein the operation comprises execution of an instruction, wherein thrashing occurs based on at least some of the separate portion of memory space and at least some of the another portion of memory space being included in the determined memory page, wherein the hypervisor detects the occurrence of thrashing, and wherein, based on detecting the occurrence of thrashing, the retargeting further comprises:

setting the permissions indicated in the paging structure for accessing, by the guest system, the memory page to indicate data read access, data write access, and instruction access by the guest system;

copying the instruction to a location in the separate portion of memory space included in the determined memory page, wherein the instruction is executed from the location in the separate portion of memory space included in the determined memory page; and based on detecting the trap of the guest system to the hypervisor after execution of the instruction, flushing a processor buffer entry caching the entry of the paging structure.

7. The method of claim 1, further comprising:

detecting, by the hypervisor, an attempt by the guest system to access the instruction portion of the self-modifying executable during execution of the self-modifying executable; and targeting, by the hypervisor, the attempt to access the instruction portion to the another portion of memory space, in which the self-modifying executable is loaded for execution.

8. The method of claim 1, wherein the hypervisor executes on the processor at a higher privilege than the guest system executes on the processor.

9. The method of claim 1, wherein the method further comprises checking, during execution of the self-modifying executable, the instruction portion of the self-modifying executable to detect whether modification to the instruction portion has occurred, wherein the checking comprises:

generating a hash of at least a portion of the instruction portion of the self-modifying executable loaded for execution in the another portion of memory space; and determining whether the generated hash matches an expected hash generated prior to commencement of execution of the self-modifying executable, wherein a mismatch between the generated hash and the expected hash indicates that modification to the instruction portion has occurred.

10. The method of claim 1, wherein the hypervisor comprises a shim for performing the retargeting, wherein the shim comprises separate data and instruction portions to facilitate checking of the instruction portion of the shim to detect whether modification to the instruction portion of the shim has occurred, and wherein the shim provides self-checking, in which one or more instructions of the instruction portion of the shim execute to perform the checking of the instruction portion of the shim.

11. A computer program product to facilitate trusted execution of a self-modifying executable, the computer program product comprising:

a non-transitory computer readable storage medium readable by a processor and storing instructions for execution by the processor to perform a method comprising:

detecting, by a hypervisor managing execution of a guest system, an attempt by the guest system to access a data portion of the self-modifying executable during execution of the self-modifying executable, the self-modifying executable comprising the data portion for storing data to be accessed during execution of the self-modifying executable and an instruction portion comprising instructions for execution of the self-modifying executable; and retargeting, by the hypervisor, the attempt to access the data portion to a separate portion of memory space, separate from another portion of memory space in which the self-modifying executable is loaded for execution.

12. The computer program product of claim 11, wherein the retargeting comprises modifying, by the hypervisor, an entry in a paging structure to indicate a memory page that includes at least a portion of the separate portion of memory space, wherein the retargeting directs the attempt to access the data portion to the memory page.

13. The computer program product of claim 11, wherein the separate portion of memory space is included in at least one memory page, and wherein the method further comprises, prior to the detecting, indicating by the hypervisor in a paging structure permissions for accessing, by the guest system during execution of the self-modifying executable, each memory page of the at least one memory page, wherein the permissions for a memory page of the at least one memory page indicate data read and data write access, but not instruction access by the guest system.

14. The computer program product of claim 13, wherein the attempt to access the data portion is detected based on an attempt to perform an operation by the guest system, wherein execution of the guest system is halted based on the attempt to perform the operation, and wherein the retargeting comprises:

setting a trap flag to initiate a trap of the guest system to the hypervisor after performance of the operation by the guest system;

determining, by the hypervisor, a memory page of the at least one memory page to which the access attempt is to be targeted, and performing a modification to an entry in the paging structure to indicate the determined memory page to which the access attempt is to be targeted;

initiating resumption of execution of the guest system, wherein the guest system performs the operation and wherein the access to the data portion is targeted to the determined memory page based on the modification to the entry in the paging structure; and based on detecting the trap of the guest system to the hypervisor after performance of the operation, clearing at least one permission of the permissions indicated in the paging structure for accessing, by the guest system, the memory page, and unsetting the trap flag.

15. The computer program product of claim 11, wherein the hypervisor executes on the processor at a higher privilege than the guest system executes on the processor.

16. The computer program product of claim 11, wherein the method further comprises checking, during execution of the self-modifying executable, the instruction portion of the self-modifying executable to detect whether modification to the instruction portion has occurred, wherein the checking comprises:
  generating a hash of at least a portion of the instruction portion of the self-modifying executable loaded for execution in the another portion of memory space; and
  determining whether the generated hash matches an expected hash generated prior to commencement of execution of the self-modifying executable, wherein a mismatch between the generated hash and the expected hash indicates that modification to the instruction portion has occurred.

17. A computer system to facilitate trusted execution of a self-modifying executable, the computer system comprising:
  a memory; and
  a processor in communication with the memory, wherein the computer system is configured to perform a method comprising:
    detecting, by a hypervisor managing execution of a guest system, an attempt by the guest system to access a data portion of the self-modifying executable during execution of the self-modifying executable, the self-modifying executable comprising the data portion for storing data to be accessed during execution of the self-modifying executable and an instruction portion comprising instructions for execution of the self-modifying executable; and
    retargeting, by the hypervisor, the attempt to access the data portion to a separate portion of memory space, separate from another portion of memory space in which the self-modifying executable is loaded for execution.

18. The computer system of claim 17, wherein the retargeting comprises modifying, by the hypervisor, an entry in a paging structure to indicate a memory page that includes at least a portion of the separate portion of memory space, wherein the retargeting directs the attempt to access the data portion to the memory page.

19. The computer system of claim 17, wherein:
  the separate portion of memory space is included in at least one memory page, wherein the method further comprises, prior to the detecting, indicating by the hypervisor in a paging structure permissions for accessing, by the guest system during execution of the self-modifying executable, each memory page of the at least one memory page, wherein the permissions for a memory page of the at least one memory page indicate data read and data write access, but not instruction execution access by the guest system;
  the attempt to access the data portion is detected based on an attempt to perform an operation by the guest system, wherein execution of the guest system is halted based on the attempt to perform the operation; and
  wherein the retargeting comprises:
    setting a trap flag to initiate a trap of the guest system to the hypervisor after performance of the operation by the guest system;
    determining, by the hypervisor, a memory page of the at least one memory page to which the access attempt is to be targeted, and performing a modification to an entry in the paging structure to indicate the determined memory page to which the access attempt is to be targeted;
    initiating resumption of execution of the guest system, wherein the guest system performs the operation and wherein the access to the data portion is targeted to the determined memory page based on the modification to the entry in the paging structure; and
    based on detecting the trap of the guest system to the hypervisor after performance of the operation, clearing at least one permission of the permissions indicated in the paging structure for accessing, by the guest system, the memory page, and unsetting the trap flag.

20. The computer system of claim 17, wherein the hypervisor executes on the processor at a higher privilege than the guest system executes on the processor.

* * * * *